United States Patent
Le Pallec et al.

(10) Patent No.: US 9,509,582 B2
(45) Date of Patent: Nov. 29, 2016

(54) TRACEROUTE_DELAY DIAGNOSTIC COMMAND

(75) Inventors: Michel Le Pallec, Nozay (FR); Dinh Thai Bui, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 474 days.

(21) Appl. No.: 13/979,189

(22) PCT Filed: Jan. 3, 2012

(86) PCT No.: PCT/EP2012/050055
§ 371 (c)(1),
(2), (4) Date: Oct. 23, 2013

(87) PCT Pub. No.: WO2012/095335
PCT Pub. Date: Jul. 19, 2012

(65) Prior Publication Data
US 2014/0043992 A1    Feb. 13, 2014

(30) Foreign Application Priority Data
Jan. 12, 2011    (EP) .................................... 11290011

(51) Int. Cl.
H04L 12/26    (2006.01)

(52) U.S. Cl.
CPC ......... *H04L 43/0852* (2013.01); *H04L 43/045* (2013.01); *H04L 43/10* (2013.01); *H04L 43/106* (2013.01); *H04L 43/12* (2013.01)

(58) Field of Classification Search
CPC . H04L 43/106; H04L 43/10; H04L 43/0852; H04L 43/12; H04L 43/045
See application file for complete search history.

(56) References Cited

U.S. PATENT DOCUMENTS 6,868,068 B1 *    3/2005    Jain ....................... H04L 43/087
370/252

2004/0081101 A1 *    4/2004    Bennett ............... H04L 41/5009
370/252

(Continued)

FOREIGN PATENT DOCUMENTS

WO    WO-02095609 A1    11/2002

OTHER PUBLICATIONS

International Search Report PCT/ISA/210 for PCT/EP2012/050055 dated Apr. 12, 2012.

(Continued)

*Primary Examiner* — Omer S Mian
(74) *Attorney, Agent, or Firm* — Harness, Dickey & Pierce, P.L.C.

(57) ABSTRACT

A method for measuring the resident time of a probe message in at least a network node comprised within a network path, the probe message provided with a Time-To-Live value, the method including steps of: registering the receive timestamp of the probe message; writing the receive timestamp into a dedicated field within the received probe message; checking the Time-To-Live value of the probe message; decrementing the Time-To-Live value by one if the Time-To-Live value is not null, and if the Time-To-Live value is equal to one, then: registering the transmit timestamp of the probe message; computing the probe message resident time within the network node by subtracting the registered receive timestamp to the registered transmit timestamp; writing the computed resident time into a field within the probe message; and changing the value of a flag within the received probe message in order to protect the resident time from being over written by subsequent action on the probe message.

15 Claims, 2 Drawing Sheets

(56) References Cited

U.S. PATENT DOCUMENTS

| | | | |
|---|---|---|---|
| 2005/0018647 A1* | 1/2005 | Lebrun | H04L 29/12009 370/351 |
| 2005/0111487 A1 | 5/2005 | Matta et al. | |
| 2005/0243733 A1* | 11/2005 | Crawford | H04L 29/06027 370/252 |
| 2006/0159025 A1* | 7/2006 | Abdo | H04L 12/2602 370/249 |
| 2008/0019282 A1* | 1/2008 | Alaria | H04L 43/106 370/252 |
| 2008/0259813 A1 | 10/2008 | Matta et al. | |
| 2009/0161569 A1 | 6/2009 | Corlett | |
| 2010/0177643 A1 | 7/2010 | Matta et al. | |
| 2014/0241189 A1* | 8/2014 | Larsen | H04W 4/023 370/252 |

OTHER PUBLICATIONS

Written Opinion PCT/ISA/237 for PCT/EP2012/050055 dated Apr. 12, 2012.

* cited by examiner

```
+-------------------+----------------+-----------------------------+
|      Type         |     Code       |         Checksum            |
+-------------------+----------------+-----------------------------+
|         Identifier                 |      Sequence Number        |
+------------------------------------+-----------------------------+
| Originate Timestamp                                              |
+------------------------------------------------------------------+
|  Receive Timestamp                                               |
+------------------------------------------------------------------+
| Transmit Timestamp                                               |
+------------------------------------------------------------------+
```

```
+-------------------+----------------+-----------------------------+
|      Type         |     Code       |         Checksum            |
+-------------------+----------------+-----------------------------+
|         Identifier                 |      Sequence Number        |
+------------------------------------+-----------------------------+
|L| Outbound Resident Time                                         |
+------------------------------------------------------------------+
|  Receive Timestamp                                               |
+------------------------------------------------------------------+
|L| Return Resident Time                                           |
+------------------------------------------------------------------+
```

```
+------------+------------------+-------------------------------+
| Version    |  Message Type    |      Outbound/Return          |
+------------+------------------+-------------------------------+
| Identifier                    |      Sequence Number          |
+-------------------------------+-------------------------------+
|L|   Outbound Resident Time                                    |
+--------------------------------------------------------------+
|       Receive Timestamp                                       |
+--------------------------------------------------------------+
|L|      Return Resident Time                                   |
+--------------------------------------------------------------+
|       Originator Transmit Timestamp                           |
+--------------------------------------------------------------+
|       One-way Receive Timestamp                               |
+--------------------------------------------------------------+
```

TRACEROUTE_DELAY DIAGNOSTIC COMMAND

This application is the national phase under 35 U.S.C. §371 of PCT International Application No. PCT/EP2012/050055 which has an International filing date of Jan. 3, 2012, which claims priority to European patent application number 11290011.3 filed Jan. 12, 2011; the entire contents of each of which are hereby encorporated by reference.

FIELD OF THE INVENTION

This invention relates generally to the technical field of networks delay/latency management.

BACKGROUND OF THE INVENTION

Network-introduced delays are amongst the most important network performance metrics as they directly impact several wide area network applications ranging from real-time applications such as VoIP, interactive network gaming, to time-critical financial applications and localization systems.

Thus, monitoring the performance of data transmission delay within networks must involve a detailed understanding of how and where these delays are introduced.

Within traditional TDM technologies, network delay is predictable as per the deterministic transition time across TDM switches (e.g. in term of number of system clock transitions). However, with the tremendous increase in bandwidth demand, TDM is progressively replaced by Packet Switch Networks (PSNs) where packet jitters, also called as packet delay variations (random processes essentially induced by packet queuing), make packet resident time within the network node (called as network node resident time from now on) unpredictable.

Accordingly, PSN network operators need more than ever tools to monitor network delay or network latency in order to be able to take appropriate actions (e.g. network redesign/reconfiguration) aiming at respecting the Service Level Agreements (SLAs) and correcting SLA violations in term of network delay/latency.

To address these problems, Network operators, generally, rely on various end-to-end time-delay measurement tools such as
- the PING command defined over the Internet Control Message Protocol (ICMPv4-RFC 792 and ICMPv6-RFC4443) which allows for the measure of the end-to-end round-trip delay from a source to a destination host in an IP network;
- the one-way delay measurement method described by RFC 2679. This method may require time synchronization depending on the network delay/latency value, the required precision of the measurement and on the clock accuracy at both ends;
- the traceroute (or tracert) command allowing to determine the address of each network node (i.e. each network-layer device) along a network path from a source to a destination host. Traceroute also returns the end-to-end delays, respectively, from the source to each traversed node within the network path.

However, these tools return the whole end-to-end delay without any precision on the network node resident time (or latency). In other word, the returned delay value by these tools is considered as a single unitary component, already including the network node resident time without any precision thereon.

The network-introduced delay may be broadly divided into:
- network node resident time, notably comprising
    - the time needed by a network node to process (processing delay) a packet and prepare it for (re)transmission. The processing delay is mainly function of the protocol stack complexity, of the computational power available (i.e. the available hardware) at each node and of the card driver (or interface card logic); and
    - the queuing delay, i.e. the total waiting time of packets within buffers of a network node before processing and/or transmission, which may depends on the details of the switching (or lower layer switches) of the network node
- the transmission delay: the time needed to transmit an entire packet (from first bit to last bit) or more basically a single bit from the output port of a first network node to the input port of a second network node.

Accordingly, by returning the whole end-to-end delay in a single value without giving any details on its components, up-to-date end-to-end delay measurement tools do not allow the operator to figure out the network segment(s) or the network node(s) where corrective actions should be applied to solve the latency budget exceeding issue.

Yet another problem of the prior art is that existent network diagnostic tools do not permit to determine what fraction of the total transfer latency is due to network node resident time.

One object of the present invention is to address the above-noted and other problems with the related art.

Another object of the present invention is to pinpoint where dominant delays are introduced within a network path.

Another object of the present invention is to provide a fine-grained composition of the network-introduced delays.

Another object of the present invention is to propose a method that permits to determine the per-node latency.

Another object of the present invention is to provide a command which, by controlling the content of a probe message, provides a fine-grained picture of end-to-end delays that this packet undergo.

Another object of the present invention is to split the end-to-end delay into components distinguishing the nodes resident times along a path from a source to a destination within an IP network.

Another object of the present invention is to permit operators to make rapid and precise diagnostic of the SLA violation issue (quality of the committed service not respected) in term of network latency.

Another object of the present invention is to provide a diagnostic command that permit to accurately pinpoint the sources of important delays in Internet applications.

Another object of the present invention is to uncover dominant network hops introducing to most latency and being responsible for delay degradation.

DESCRIPTION OF THE DRAWING

The objects, advantages and other features of the present invention will become more apparent from the following disclosures and claims. The following non-restrictive description of preferred embodiments is given for the purpose of exemplification only with reference to the accompanying drawing in which

SUMMARY OF THE INVENTION

Figures 1, 2, 3:
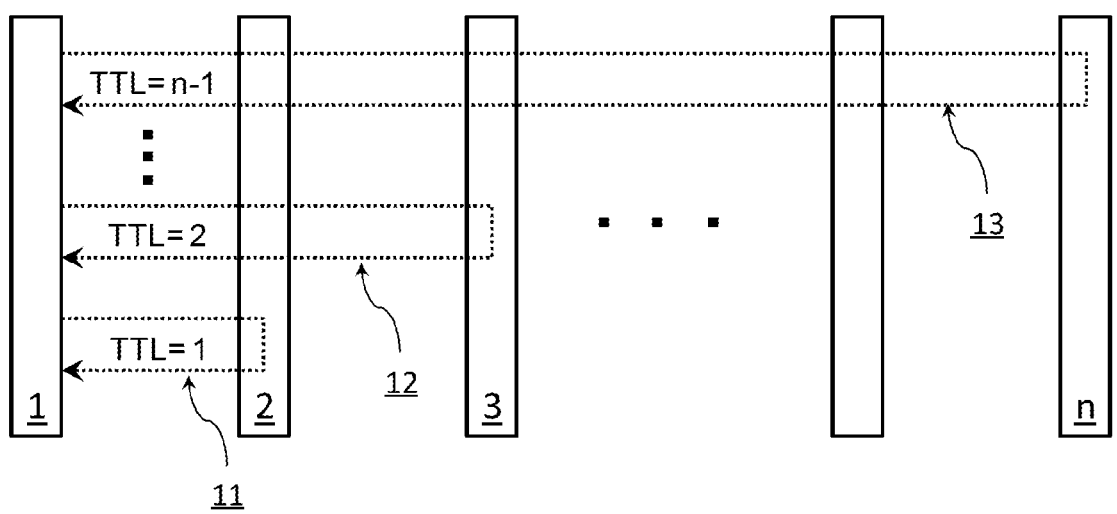
FIG. 1 is block diagram illustrating the format of a probe header according to the prior art.
FIG. 2 is a block diagram illustrating the format of a probe header according to a first embodiment.
FIG. 3 is a block diagram illustrating an embodiment of the prior art diagnostic command traceroute( )

The present invention is directed to addressing the effects of one or more of the problems set forth above. The following presents a simplified summary of the invention in order to provide a basic understanding of some aspects of the invention. This summary is not an exhaustive overview of the invention. It is not intended to identify critical elements of the invention or to delineate the scope of the invention. Its sole purpose is to present some concepts in a simplified form as a prelude to the more detailed description that is discussed later.

The present invention relates to a method for measuring the resident time of a probe message in at least a network node comprised within a network path, said probe message provided with a Time-To-Live value, said method including the following steps:
registering the receive timestamp of the probe message;
writing the receive timestamp into a dedicated field within the received probe message;
checking the Time-To-Live value of the probe message;
if the Time-To-Live value is not null, decrementing the Time-To-Live value by one.
if the Time-To-Live value is equal to one, then:
  registering the transmit timestamp of the probe message;
  computing the probe message resident time within the network node by subtracting the registered receive timestamp to the registered transmit timestamp
  writing the computed resident time into a field within the probe message;
  changing the value of a flag within the received probe message in order to protect the resident time from being over written by subsequent action on the probe message.

In accordance with a broad aspect, the cited above method further comprises the following steps
if the Time-To-Live value is null, after being decremented, then
  creating a probe reply message with copying therein the computed resident time, its associated flag value and the probe message identifier from the probe message;
  sending the created probe reply message towards the originator of the probe message.

In accordance with a broad aspect, the probe message is a modified Internet Control Message Protocol (ICMP) message.

In accordance with another broad aspect, the probe message is a modified Operation Administration Maintenance (OAM) message such as an MPLS-TP/MPLS OAM message or an Ethernet OAM message.

Advantageously, the computed resident time of the probe message within the network node is equal to its resident time within the main protocol layer/stack which is responsible for the probe message processing (i.e. coding/decoding). Thus, the use of probe messages at different protocol layers allows for analyzing the impact of different protocol layers on each node delay budget.

The present invention further relates to a network node comprising
  means for registering the receive timestamp of a probe message;
  means for writing the receive timestamp into a dedicated field within the received probe message;
  means for checking the value of the Time-To-Live of the probe message;
  means for registering the transmit timestamp of the probe message;
  means for computing, then writing the probe message resident time, which is the difference between the registered transmit timestamp and the written receive timestamp, into a field within the probe message;
  means for changing the value of a flag within the probe message in order to protect the computed resident time value from being over written by subsequent actions of other nodes or of the present node itself on the probe message;
  means for decrementing and comparing the value of the Time-To-Live of the probe message;
  means for creating a probe reply message therein are copied different information from the probe message, especially the computed resident time.

The present invention further relates to a computer program product adapted to perform the method cited above.

While the invention is susceptible to various modification and alternative forms, specific embodiments thereof have been shown by way of example in the drawings. It should be understood, however, that the description herein of specific embodiments is not intended to limit the invention to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DETAILED DESCRIPTION OF ILLUSTRATIVE EMBODIMENTS

A diagnostic command, designated below as traceroute_delay( ) is provided. This designation is given only for naming purpose, somewhat jointly referring to traditional traceroute( )command (e.g. RFC1393) and to delay measurement issue. Obviously, any other name may be given therefor.

By controlling probe message headers, traceroute_delay( )command collects, in addition to traversed node addresses, traversed node resident times and eventually traversed link propagation delays.

In one embodiment, the probe is a modified ICMP message. In fact, traceroute_delay( )command makes use of some fields of ICMP timestamp, and ICMP timestamp replay message (RFC 972), differently from what they are expected for (providing a new semantic to these existing fields).

With reference to FIGS. 1 and 2, the fields "Originate Timestamp", "Receive Timestamp", and "Transmit Timestamp" of conventional ICMP Timestamp or Timestamp Replay message (RFC 972) (FIG. 1) are, respectively, replaced, in accordance with the traceroute_delay( )command, with (FIG. 2) "Outbound Resident Time", "Receive Timestamp", and "Return Resident Time" fields. Moreover, a flag "L" is associated to each one of "Outbound Resident Time" and "Return Resident Time" fields.

Therefore, the probe header, according to traceroute_delay( )command, comprises common fields with ICMP Timestamp and Timestamp Reply message such as the fields "Type", "Code", "Checksum", "Identifier", and "sequence number" (FIGS. 1 and 2). These fields are used in accordance with their respective prior art recognized functions (i.e. their standard interpretation such as the "Checksum" field to determine a corruption of data chunk, or the "Identifier" field permitting to identify the message);

the "Outbound Resident Time" field: this field is the packet resident time in the network node in the outbound direction (in micro-seconds);

the "Receive Timestamp" field: this field is a placeholder to log the packet receive timestamp at each traversed node. This allows the node to compute the packet resident time at transmission by subtracting this timestamp to the transmit timestamp;

the "Return Resident Time": this field is the packet resident time in the router in the Return direction (in micro-seconds)

an "L"-bit: a flag to lock the respective field (Outbound/Return Resident Time) and prevent it from being overwritten by subsequent processings of the packet by other nodes or by the present node itself.

It is noteworthy to mention that the use of modified ICMP Timestamp or Timestamp Reply message is only for the purpose of taking advantage of these already standardized but rather unused messages, leading to a rapid implementation and deployment.

Alternatively, the above-described probe format may be defined without any regards to ICMP Timestamp and/or Timestamp Reply message. Then, a probe header is conceived to include "Outbound Resident Time", "Receive Timestamp", "Return Resident Time" fields, and a protecting flag "L" associated to each one of "Outbound Resident Time" and "Return Resident Time" fields. These fields are programmed for the above described tasks.

The traceroute_delay( )command has the following syntax:

traceroute_delay (destination address, [QoS, mode])
wherein
"destination address" is the address of the destination network node;
"QoS" specifies the Quality of Service (QoS) or Class of Service (CoS) value to tag the related protocol probe message transporting the traceroute_delay( )command at its originating point. By default or in the absence of a value specified by the operator, "QoS" value is set to the "Best Effort" value;
"mode" indicates the operational mode of the command, meaning one-way (i.e. value 0) or two-way (i.e. value 1) mode. By default or in the absent of a value specified by the operator, the value is set to 1.

The format of "destination address" depends on the technology and the protocol used to transport the traceroute_delay( )command. For example, it can be an IP address (or a hostname), if this command is transported via an extension of the ICMP (RFCs 4884 & 5837); or an NSAP (Network Service Access Point) address, if this command is transported via an Multi-protocol Label Switching Transport Profile (MPLS-TP) OAM protocol (Operation And Maintenance, also known as Operation Administration and Maintenance) (RFC 5860) in a non-IP network The input "QoS" is the value that will be set:

for the Differentiated Services Code Point (DSCP) field in the IP header if protocol over IP, such as ICMP, is used;

for the 3-bit reserved field for Experimental use (EXP) in the generic Multi-protocol Label Switching (MPLS) label if MPLS OAM or Pseudo-wire (PW) OAM is used; or for the 3-bit Priority Code Point (PCP) field as referred to by IEEE802.1p if Ethernet OAM is used to transport the different traceroute_delay( )messages.

Indeed, the data packet delay often depends on its assigned "QoS" (at the originating/departing point), as per differentiated service treatment applied at each traversed node and on the related scheduling configured.

In regards with "mode" input, as per packet jitter magnitude differs in each communication direction (outbound direction and return direction), packet resident times are often different for each direction. Accordingly, the two modes, namely one-way mode and two-way mode, are provided. The "Identifier" field most significant bit allows for segregating between the one-way (value 0) and round-trip delay (value 1) measurement mode.

More generally, other input parameters may be also considered to define an invocation of the traceroute_delay( )command such as:

"protocol" to mention the probe packet protocol such as UDP (by default), ICMP, or TCP;

"p" to indicate the number of probe packets per network node.

To introduce the behavior of traceroute_delay( )command, a brief reminder of the basic algorithm of the traditional traceroute command is depicted on FIG. 3.

On ICMPv4,traditional traceroute( )command works by causing each node (from 2 to n) along the network path linking nodes (from 1 to n) to return an ICMP error message. Probing is done hop-by-hop, moving away from the source towards the destination i (i=2,. . . , n) in a series of round-trips 11-13. The Time-To-Live or hop count starts at one and is incremented after each round-trip 11-13 until the destination node n is reached, or until another stopping condition applies.

In fact, traditional traceroute( )sends its first group of packets with TTL=1 (Time-to-Live). The first router along the path (node 2) will therefore discard the packets (their TTL decremented to zero) and return the ICMP "TTL Exceed" error message (round-trip 11). Thus, the traceroute( )can register the first router (node 2) address. Packets can then be sent with TTL=2 (round-trip 12), and then TTL=3 and so on (round-trip 13), causing each router along the path to return an error, identifying it to the traceroute( )command (located at the source router or host). Eventually, either the final destination (node n) is reached, or the maximum TTL value (default is 30) is reached and traceroute( )ends. At final destination, a different error is returned.

Some implementations work by sending UDP datagram to some random high-numbered port where nothing is listening, some other implementations use ICMP Echo packets.

Figures 4, 5:
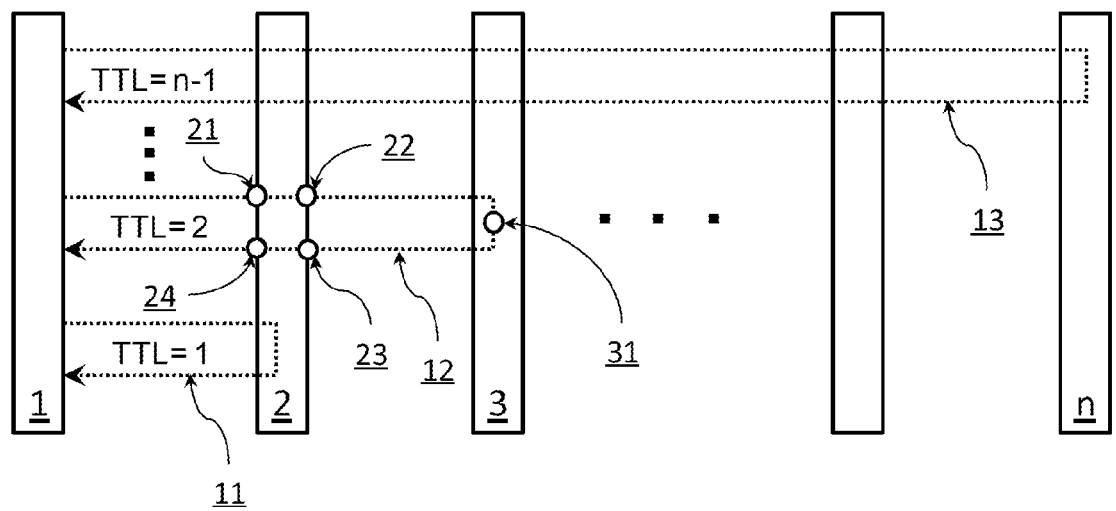
FIG. 4 is a block diagram illustrating a functional embodiment of a diagnostic command.
FIG. 5 is a block diagram illustrating the format of a probe header according to a second embodiment.

With reference now to FIG. 4, similar to conventional traceroute( ) command, traceroute_delay( )sends successively ICMP Timestamp messages with TTL=1 (round-trip 11), then TTL=2 (round-trip 12), and so on (round-trip 13) to the destination gateway (node n). This direction towards node n is called as the outbound direction. The opposite direction is called as return direction.

For the outbound direction, each traversed node i (i=2, n) realizes the following operations:

(step 21 on FIG. 4):
registering of the Timestamp packet reception time as soon as the responsible protocol detects the packet presence (e.g. at the input port using hardware timestamping) (which marks the time instant at which this packet is received by the associated protocol stack (e.g. IP protocol, Ethernet protocol, etc) within the network node), and writing the timestamp value into the packet "Receive Timestamp" field (step 21);
decrementing the TTL by one;

(step 22 on FIG. 4), if the TTL=1,then, at packet transmission process (e.g. at the output port),
registering the packet transmit timestamp, marking the time instant at which this packet leaves the associated protocol stack for transmission (e.g. for an IP stack, this is the instant when the IP stack handles the ICMP packet to a transport layer, such as the Ethernet layer, for transmission);
computing the packet resident time in node i as the difference between the transmit timestamp and the receive timestamp of the packet measured at this node;
writing the so-computed resident time value into the packet "Outbound Resident Time" field;
setting the L-bit of this field to 1 in order to protect it from being overwritten by subsequent actions (if the L-bit has been already set, then there is an error case: either the previous node forgot to decrement the TTL value or it set the L-bit by error; then the action is not to forward the packet but send back a "Timestamp Reply" message with "Outbound Resident Time" field set to 0 and the associated L-bit set to 1);

else if the destination is reached or the TTL=0 (step 31 on FIG. 4),
creating a "Timestamp Reply" message is created with its "Outbound Resident Time" field and associated L-bit being duplicated/copied from the "Timestamp" message. It is also the case for the "Identifier" field. The "Timestamp Reply" message is sent back to the originator of the "Timestamp message";
if the TTL=0 and the destination is not reached, sending back an ICMP "TTL Exceed" error message to the originator.

For the return direction, each node realizes the following operations:

(step 23 on FIG. 4):
registering the Timestamp Reply packet receive timestamp as soon as it detects the packet (e.g. at its input port); and
writing the receive timestamp value into the packet "Receive Timestamp" field;

(step 24 on FIG. 4), if the most significant bit of the "Identifier" field is set (two-way mode, i.e. the value 1) and the "Return Resident Time" associated L-bit is not set, then, at its output port,
computes the packet resident time based on the receive timestamp: the difference between the transmit timestamp and the receive timestamp; and
writing the so-computed value into the packet "Return Resident Time" field;
setting the associated L-bit to 1 in order to protect the "Return Resident Time" field from being over written by subsequent actions.

An illustrative example, with TTL=2,of the above algorithm application is shown on FIG. 4 (round-trip 12). In this example:
node 2 writes the receive timestamp value in the field "Receive Timestamp field" of the received probe as soon as it detects the packet from the input port (step 21 on FIG. 4);
node 2 decrements TTL by 1. As TTL=1,then node 2 computes the resident time and writes it to the "Outbound Resident Timestamp", with L-bit set to 1 to protect this field from being over written (step 22 on FIG. 4);
node 3 decrements TTL to 0. Before discarding the "Outbound Resident Timestamp", node 3 copies the appropriate fields to the associated fields in the newly created Timestamp Reply message. Node 3 sends the latter message back to the source router or source host (step 31 on FIG. 4);
node 2 registers the packet receive timestamp and writes the later into the "Receive Timestamp" field
if the most significant bit of the "Identifier" field is set to two-way mode, node 2 computes, at its output port, the return resident time and update the field "Return Resident Time" of the Timestamp Reply message. Then, the L-bit related to this later field is set to 1 in order to protect it from being over written (step 24 on FIG. 4).

More generally, within each round-trip 11-13 wherein TTL=i (i=1, . . . , n-1), the resident time in the node i, in one-way and/or in two-way mode, is measured then stored within the probe message header. Accordingly, different unidirectional resident times (or unidirectional latencies) per nodes may be displayed, for the operator, in a summarizing table.

To that end, the network node i (i=2, . . . , n) comprises
means for registering the receive timestamp of a probe packet from its input port as soon as it detects the probe packet (i.e. as detected by the associated protocol stack);
means for writing the receive timestamp into a field within the probe packet;
means for checking and comparing the value of the Time-To-Live of the probe packet;
means for registering the transmit timestamp of the probe packet (i.e. at the instant at which the packet leaves the associated protocol stack for transmission);
means for computing and writing the packet unidirectional resident time, which is the difference between the registered transmit timestamp and the receive timestamp, into a field within the probe packet;
means for changing the value of a flag within the probe packet in order to protect the computed resident time value from being over written by subsequent actions on the probe message (by other network nodes or by the node itself);
means for decrementing and comparing the value of the Time-To-Live of the probe packet.

It is to be noted that if a node receive a probe packet with a TTL strictly greater than one after being decremented by one, the probe packet is forwarded without resident time measurement step.

Another embodiment on MPLS-TP OAM makes use, in addition to the above described algorithm, the IETF document "*Operating MPLS Transport Profile LSP in Loopback Mode*", March 2010.

Different OAM Loopbacks are to be performed by the sending/source Maintenance End Point (MEP) with increasing TTL from 1 until reaching the remote/destination MEP.

An MPLS-TP OAM-embedded traceroute_delay message is defined for this purpose. Its format (MPLS-TP traceroute_delay) is shown on FIG. 4, and wherein:
- "Outbound/Return" is to specify the message direction: Outbound (value 0x00—equivalent to the previous "Timestamp" message) direction or Return direction (value 0x01—equivalent to the previous "Timestamp Reply" message);
- "L-bit" has the same semantic as described previously in the ICMP embodiment;
- "Outbound Resident Time" has the same semantic as described previously in the ICMP embodiment;
- "Receive Timestamp" has the same purpose as described previously in the ICMP embodiment;
- "Return Resident Time" has the same semantic as described previously in the ICMP embodiment;
- "Originator Transmit Timestamp" indicates the timestamp of the packet when it is transmitted by the source/originator (according to the originator local clock);
- "One-way Receive Timestamp" indicates the timestamp of the packet when it is received by the destination node (according to the destination node local clock).

The last two field allows for the traceroute_delay( ) command to compute an end-to-end one-way delay (i.e. "One-way Receive Timestamp"—"Originator Transmit Timestamp"). This supposes that the destination node clock is synchronized to the originator clock with an accuracy conformed to the measurement requirements.

The "Originator Transmit Timestamp" allows the originator for computing the round-trip delay at reception of the Return message. This imposes that the "Originator Transmit Timestamp" field of the "Outbound" message (this message is equivalent to the "Timestamp" message in the previous embodiment) is copied to the "Originator Transmit Timestamp" field of the "Return" message (this message is equivalent to the "Timestamp Reply" message in the previous embodiment).

It is to be noted that in the previous ICMP embodiment, the originator can still measure the round-trip delay even in the absence of the "Originator Transmit Timestamp". It can, for instant, log for each message identifier (i.e. "Identifier" field) value the associated transmit timestamp locally (i.e. in its local context memory) and logs the receive timestamp of the "Timestamp Reply" message with the same identifier.

It is noteworthy to mention that successive round-trip times measured allow the traceroute_delay( ) command for computing the total link delay by subtracting the node resident times from the round-trip time (assuming link delays are symmetric).

The network node resident time is monitored at each protocol layer independently from the other layers. For example, in an IP/Ethernet network:
- the ICMP/IP protocol layer logs the packet reception time (receive timestamp) as the instant when it can detect (from the IP protocol stack view) the incoming packet from the incoming Ethernet MAC interface; and it logs the packet transmission time (transmit timestamp) as the instant when it handles the packet to the outgoing Ethernet MAC interface;
- the Ethernet OAM layer logs the packet reception time (receive timestamp) as the instant when it can detect the Frame Start of incoming packet from the incoming physical interface; and it logs the packet transmission time (transmit timestamp) as the instant when it handles the packet to the outgoing physical interface.

Thus, for a given network node, the average resident time as reported at the ICMP/IP layer is smaller than the one reported by the Ethernet OAM layer. For the latter (lowest protocol within the protocol stack), hardware timestamping can be implemented. This way allows for analyzing, within a given node, the protocol layer which impacts most the network node latency. The resident time measurement method at every layer within a node is implementation specific and is not in the scope of this invention.

It is to be noted that the "Timestamp Reply" message IP source address does not provides the traceroute_delay( ) with the IP address of the node where both the outbound and return resident times are measured but with the IP address of the next node on the outbound path. To gets the node IP address, the command should refer to the previous "Timestamp Reply" message.

traceroute_delay( ) may use different methods for sending probe messages, such as
- packet-by-packet: as the conventional traceroute, i.e., sends a probe, waits for an answer or a timeout, sends the following probe, and so on;
- node-by-node: sends more than one probe for a given node with a configurable delay between probes (to be entered by the operator or given by a default value), waits for answers or timeouts, and then repeats the same procedure for the next node.

It is noteworthy to mention that the command can be executed on-demand for diagnostic purpose, but can also be automatically executed at regular time intervals in a proactive manner in order to react rapidly before that the customer detects the issue.

traceroute_delay( ) command may be also included in operating systems, or encapsulated into network tools (such as NetTools).

It is to be noted that, as it concerns network node resident time measurements, there is really no need for synchronization of node clocks as the resident time is small, meaning below a few ms order. A traditional low-cost 100 ppm (part-per-million) accuracy clock (e.g. Ethernet interface clock) in free-run induces a measurement error of 1 µs ($100 \times 10^{-6} \times 10 \times 10^{-3}$) over 10 ms of resident time (and respectively a maximum measurement error below 10 µs for a typical cascade of 10 nodes).

Advantageously, the knowledge of the nodes resident times within a network path allows the identification of nodes that fail to offer acceptable delay bounds. Moreover, it permits conclusive and accurate assignment of introduced delays to either the network links, or nodes.

Advantageously, the above-described method permits to split the end-to-end time delay into two components: the transmission delays on network segments (or links) and nodes resident times. Accordingly, traceroute_delay( ) command provides a detailed view/apportionment of the end-to-end one-way (resp. two-way) delay allowing to point out network segment(s) or network node(s) to be reworked/re-engineered when the end-to-end one-way (resp. two-way) delay exceeds the SLA threshold.

The invention claimed is:

1. A method for measuring a resident time of a probe message in a first network node included in a network path, the probe message provided with a Time-To-Live value, the method comprising:
registering a receive timestamp of the probe message upon receipt of the probe message detected by one of a plurality of protocol stacks in the first network node;
writing the receive timestamp to a dedicated field within the probe message;
checking the Time-To-Live value of the probe message;

decrementing the Time-To-Live value by one if the Time-To-Live value is neither one nor null;

if the Time-To-Live value is equal to one, then registering a transmit timestamp of the probe message, the transmit timestamp corresponding to a time instant at which the probe message leaves the one of the plurality of protocol stacks for transmission, computing the resident time of the probe message within the first network node by subtracting the receive timestamp from the transmit timestamp, writing the computed resident time to the dedicated field within the probe message, determining if an error exists in the probe message, the error corresponding to failing to decrement the TTL value or having set at least one flag in the probe message in error by a second network node prior to forwarding of the probe message from the second network node to the first network node, changing a value of the at least one flag within the probe message in order to protect the computed resident time from being over written by subsequent actions on the probe message if the error does not exist, and sending, to the second network node, a first timestamp reply message with an outgoing resident time field set to null and the at least one flag set to one, if the error exists; and if the Time-To-Live value is equal to null, then sending a second timestamp reply message to the second network node when the first network node is a destination node, the second timestamp reply message including an outgoing resident time field, and sending an error message to the second network node, the error message including a Time-to-Live Exceed message when the first network node is not the destination node.

2. The method of claim 1, wherein if the Time-To-Live value is equal to one, the method further includes, creating a probe reply message by copying (i) the computed resident time, (ii) an associated value of the at least one flag of the probe message, and (iii) a probe message identifier from the probe message, and sending the created probe reply message back towards an originator of the probe message.

3. The method of claim 1, wherein the probe message further comprises:

a first field configured to carry the computed resident time within a traversed network node in a first communication direction; and a placeholder configured to log the receive timestamp from an input port of the traversed network node, wherein the at least one flag includes a first flag, the first flag configured to prevent over-writing of the first field by subsequent actions on the probe message.

4. The method of claim 3, wherein the probe message further comprises:

a second field configured to carry the resident time of the probe message within the traversed network node in a second communication direction, the second communication direction being opposite to the first communication direction, wherein the at least one flag further includes a second flag, the second flag configured to prevent over-writing of the second field by subsequent actions on the probe message.

5. The method claim 3, wherein information on the first communication direction for the traversed network node is indicated by the first field within the probe message.

6. The method of claim 1, wherein the probe message is a modified Internet Control Message Protocol message.

7. The method of claim 1, wherein the probe message is a modified Operation Administration Maintenance message.

8. A first network node comprising:

a memory having computer readable instructions stored thereon; and at least one processor configured to execute the computer-readable instructions to, register a receive timestamp of a probe message upon receipt of the probe message detected by one of a plurality of protocol stacks in a first network node, write the receive timestamp to a dedicated field within the probe message, check a Time-To-Live value of the probe message, decrement the Time-To-Live value by one if the Time-To-Live value is neither one nor null, if the Time-To-Live value is equal to one, then register a transmit timestamp of the probe message, the transmit timestamp corresponding to a time instant at which the probe message leaves the one of the plurality of protocol stacks for transmission, compute a resident time of the probe message within the first network node by subtracting the receive timestamp from the transmit timestamp, write the computed resident time of the probe message to the dedicated field within the probe message, determine if an error exists in the probe message, the error corresponding to failing to decrement the TTL value or having set at least one flag in the probe message in error by a second network node prior to forwarding of the probe message from the second network node to the first network node, change a value of the at least one flag within the probe message in order to protect the computed resident time from being over written by subsequent actions on the probe message if the error does not exist, send, to the second network node, a first timestamp reply message with an outgoing resident time field set to null and the at least one flag set to one, if the error exists, if the Time-To-Live value is equal to null, then send a second timestamp reply message to the second network node when the first network node is a destination node, the second timestamp reply message including an outgoing resident time field, and send an error message to the second network node, the error message including a Time-to-Live Exceed message when the first network node is not the destination node.

9. The first network node of claim 8, wherein the at least one processor is further configured to execute the computer-readable instructions to, create a probe reply message, the probe reply message includes information copied from the probe message.

10. The first network node of claim 9, wherein the copied information includes the computed resident time and an identifier of the probe message.

11. A non-transitory computer readable recording medium having computer-readable instructions stored thereon, the computer-readable instructions when executed by at least one processor configure the at least one processor to, perform the method of claim 1.

12. The non-transitory computer readable recording medium of claim 11, wherein the method further comprises:
   inputting a destination address of the first network node.

13. The non-transitory computer readable recording medium of claim 11, wherein the method further comprises:
   inputting a Quality of Service or a Class of Service specification for the probe message and a probe reply message, the probe reply message being associated with the probe message.

14. The non-transitory computer readable recording medium of claim 11, wherein the method further comprises:
   inputting an indication of a one-way mode or a two-way mode.

15. The non-transitory computer readable recording medium of claim 11, wherein the method further comprises:
   displaying a one-way or a two-way probe message resident time in the first network node within the network path traversed by the probe message, and a probe reply message, the probe reply message being associated with the probe message.

* * * * *